United States Patent Office 3,080,214
Patented Mar. 5, 1963

3,080,214
ATTAPULGITE CLAY FILTER AID PRODUCT AND METHOD OF MAKING SAME
James B. Duke, Metuchen, and Ernest W. Greene, Westfield, N.J., assignors to Minerals & Chemicals Philipp Corporation, Menlo Park, N.J., a corporation of Maryland
No Drawing. Continuation of applications Ser. No. 848,498 and Ser. No. 848,553, Oct. 26, 1959. This application Jan. 25, 1961, Ser. No. 84,774
11 Claims. (Cl. 23—110)

The present invention, which is a continuation of copending applications Serial No. 848,498, filed October 26, 1959 and now abandoned and Serial No. 848,553, filed October 26, 1959, and now abandoned, relates to a novel magnesium aluminosilicate product, useful particularly as a filter aid, and to the method of producing the same from attapulgite clay.

Filtration is a widely used operation in the chemical industries and is basically a straining operation designed to remove suspended solids from a liquid. Thus, filtration should be distinguished from decolorization operations in which liquids are treated with solid adsorbents which remove soluble color body impurities by a mechanism involving adsorption. A filter aid, which is a finely divided solid, may be precoated on the filter support and is usually also mixed with the liquid to be filtered. Filtration removes both the filter aid and foreign solids from the liquid, and the filter aid added with the liquid gradually forms a rigid, permeable incompressible cake on the filter cloth or screen. Fine solids originally suspended in the liquid are simultaneously entrained in the cake as it is built up and the porous nature of the cake prevents such solids from agglomerating and forming an impervious layer on the filter cloth or screen. Filtration of liquid through the porous bulky cake is thus more rapid and efficient than it would be in the absence of a filter aid. By proper choice of filter aid, a consistently high degree of clarification may be realized while still operating at an efficient filter rate with small dosage of filter aid. "Filter rate" or "flow rate" is defined as the volume of impure liquid passed through a unit area of filter cake per unit of time and is usually expressed as gallons per square foot per hour. There is a fairly general inverse correlation between flow rate and clarification capacity of filter aid products. Flow rate and clarity factors vary with the type of liquid being filtered, filter pressure, quantity and nature of filter aid used, etc.

In addition to satisfactory flow rate and clarification capacity, other properties are necessary for a good filter aid. These include inertness, cake stability, and cake adhesiveness.

Diatomaceous silica filter aids have dominated industrial filtration for many years. The high flow rates and brilliant clarity achieved through the use of such filter aids is believed to be due to the unique variegated structure of the silica diatoms which interlace themselves in the filter cake to form numerous traps for even submicroscopic particles while still providing interstices between particles to insure good cake permeability. Diatomaceous filter aids are supplied in regular milled, calcined, and flux-calcined grades, the various grades differing in filter rates and clarification capacity in various filtration processes. In general, the preparation of all grades may be considered a dry process involving removing of impurities, controlled drying, calcination (when employed), and particle size classification. Commercially available filter aid grades of diatomaceous earth are essentially pure amorphous silica in the form of a plurality of geometrical shapes, such as filiform, spicular, denticular, and plankton disc.

Many attempts have been made to produce filter aid powders competitive with the diatomaceous silica materials so as to provide new markets for other materials as well as to supply competitive or superior products. To date no material has been found which has supplanted diatomaceous filter aids in their principal applications, e.g., in sugar refining and in clarifying dry cleaning solvents, beers and wines. The use of clays (particularly specially processed clays) as filter aids has been attempeted in the past. None of the prior art procedures has provided a clay-derived product which has met industrial acceptance as has diatomaceous silica. In fact clay, which is frequently indigenous to diatomite, deposits, is considered to be such an undesirable contaminant in a diatomaceous filter aid that present day processes for treating raw diatomaceous earth for filter aid use include operations specifically intended to remove clay.

Clays are hydrated aluminum silicates in which iron or magnesium may proxy in whole or in part for the aluminum. Clay minerals may be classified on the basis of their crystalline structure. Most clays have a micaceous sheet structure. For example, kaolin clays are composed of a two-layer type mineral, and the montmorillonite clay minerals (e.g., bentonites) are of the three-layer type. In contrast with the aforementioned micaceous-type clays are attapulgite and sepiolite which are members of a unique class of clays characterized by a chainlike structure, similar to the amphibole structure, and are composed of chains of silica tetrahedrons linked together by octahedral groups of oxygens and hydroxyls containing aluminum and magnesium atoms. Attapulgite, a hydrated magnesium aluminosilicate, is the principal mineral constituent of Georgia-Florida fuller's earth which usually contains, in addition to attapulgite, varying minor amounts of quartz, sepiolite and/or montmorillonite minerals and iron minerals. A typical chemical analysis of attapulgite clay is as follows:

| | Percent |
|---|---|
| Total volatile matter | 19.93 |
| Free moisture | 12.10 |
| Volatile free basis: | |
| $SiO_2$ | 68.43 |
| $Al_2O_3$ | 12.56 |
| $Fe_2O_3$ | 4.94 |
| $MgO$ | 9.82 |
| $CaO$ | 1.67 |
| $K_2O$ | 0.70 |
| $Na_2O$ | 0.25 |
| $TiO_2$ | 0.60 |
| Others | 1.03 |

In raw attapulgite clay, the ultimate colloidally dimensioned acicular particles are oriented in a random brush-heap fashion. The ultimate attapulgite crystals composing the clay aggregate are so small they can be discerned only through the use of an electron microscope. Thus, when viewed under an optical microscope the aggregates of raw clay give no indication of the needlelike form of the plurality of attapulgite crystals composing them. In contrast, individual silica diatoms have microscopic dimensions and the unique geometrical shape of diatoms is readily perceived by examining a sample of diatomaceous earth with an optical microscope, using for example a magnification of 800. Therefore, it is apparent that silica diatoms and attapulgite crystals differ appreciably in their size. The shape factor which contributes to the utility of diatomaceous earth as a filter aid is not present in attapulgite clay aggregates in which the attapultige needles are considerably too small to function in the manner similar to that of silica diatoms.

Raw attapulgite clay is in fact completely unsatisfactory as a filter aid in that it tends to disperse in and thicken a liquid to be filtered. This is especially true of polar liquids such as water. Therefore, attapulgite clay in its naturally occurring condition functions in a manner which is the antithesis of a filter aid. It is known that the thickening or gel-forming property of attapulgite clay can be reduced or eliminated by calcining the clay. Calcination, among other things, removes water from the clay lattice and when properly controlled it enhances the adsorption properties of attapulgite clay. For this reason the controlled calcination is frequently referred to as "activation." Industrial attapulgite clay adsorbents are usually activated by calcination at temperatures within the range of about 600° F. to 1000° F. to reduce the volatile matter to about 1% to 6%. This reduction in volatile matter represents a reduction of some, but not all, of the combined water. It is known that when attapulgite clay is calcined at temperatures considerably higher than those mentioned above, such as temperatures of about 1100° F. or more with a reduction of the volatile matter below the 1% level, the value of the material as an adsorbent is sharply decreased. The term "volatile matter" (V.M.) refers to the weight percent of a material eliminated when the material is heated substantially to constant weight at about 1700° F. In the case of raw clay, volatile matter is essentially water. The term "free moisture" (F.M.), as used herein, refers to the weight percent of a material eliminated when the material is heated substantially to constant weight at 220° F.

While activation, especially in conjunction with controlled sizing, enhances the utility of the clay as an adsorbent for removing soluble impurities from various liquids, such as soluble coloring matter in oils, activated adsorbent grades of attapulgite clay, even when ground to a suitable fine particle size, are not competitive with diatomaceous earth as filter aids. The principal reason is that, in spite of the fact that the activated clay affords a good flow rate when used with clear liquids, the same is not true when attempts are made to use the activated clay to clarify liquids containing suspended impurities. For example, the process of U.S. 2,390,490, Atwell, has to do with a method for processing activated attapulgite clay to improve the flow rate of liquids therethrough. The improvement consists in controlling the drying of the raw clay before it is milled and activated. In this manner detrimental fines in the activated product are limited. We have found that the Atwell process, while providing a material with an exceptionally good flow rate for clear liquid, does not result in the production of a material which has a good flow rate when used in a filtration operation on solutions containing fine solid impurities in suspension (as opposed to soluble adsorbable impurities). As a result, Atwell's material is more useful as a decolorizing agent for adsorption of foreign color body impurities from a liquid than it is in clarification operations in which suspended impurities are to be removed from a liquid. The product provided by the Atwell method has also been found to leave much to be desired as a filter aid in the clarification of present day organic dry cleaning solutions which contain expensive detergents. Georgia-Florida fuller's earth processed in accordance with prior art activation processes tends to adsorb and deplete detergents from the dry cleaning solutions and is unacceptable for this reason.

Accordingly, an object of the present invention is to provide a filter aid product from attapulgite clay which will overcome the aforementioned difficulties.

An important object of the invention is the transformation of attapulgite clay into a novel low bulk density, anhydrous magnesium aluminosilicate product having essentially the same volatile free chemical analysis as attapulgite clay but differing in physical form, properties and potential fields of use from forms of attapulgite clay or other materials presently known.

A more specific object of the invention is to provide a filter aid product from attapulgite clay, which product possesses clarification and flow rate properties in industrial filtration operations, such as in sugar refining, as good as or superior to those of high quality diatomaceous earth filter aids presently used for the purpose.

Still another object of the invention is the provision of a filter aid powder from attapulgite clay which may be used in the clarification of dry cleaning solvents containing detergents with minimal adsorption of the detergent.

Still another object of the invention is a novel method of processing attapulgite clay.

Other objects and features of our invention will be apparent from the description thereof which follows.

The present invention is a result of our discovery that a novel amorphous anhydrous magnesium aluminosilicate product, resembling certain filiform diatoms in size, form and utility, can be prepared from attapulgite clay, but not from the micaceous-type clays such as kaolin and bentonite clays, by a "wet" process hereafter described.

Broadly stated, the method of the present invention comprises the initial step of agitating a small amount of colloidal attapulgite clay in water containing a deflocculating agent for the clay, thereby forming a deflocculated aqueous slip of the clay in which aggregates of the clay are dispersed substantially completely into ultimate colloidally dimensioned acicular attapulgite particles. The fluid deflocculated clay dispersion thus produced is dried to a grindable consistency by evaporation of water therefrom while maintaining the fluid dispersion quiescent—that is, without appreciable boiling of the slip and without agitating the slip during drying.

The dried material is milled to a fine powder prior to a calcination treatment at extremely high temperature for a time sufficient to eliminate substantially completely water of composition from the attapulgite crystals without fusing the material. The calcination is carried out at temperatures appreciably higher than temperatures used in activating attapulgite clay for use as an industrial adsorbent. The calcined product, which is a pulverulent mass, is then pulverized to provide the desired filter aid powder.

The resultant magnesium aluminosilicate product consists predominately of particles which may be distinctly discerned in an optical microscope (at 810×magnification, for example), as discrete or clustered elongated particles, similar to fibers or rods and generally unsymmetrical in form. The particles are similar in size to the filiform or acicular diatomite particles at the same magnification although the latter usually exhibit a higher degree of symmetry and appear to have straight surfaces, as opposed to the irregular surfaces of the particles of the product of our invention. Chemically, our magnesium aluminosilicate product has essentially the same analysis as volatile free attapulgite clay although it contains a very small amount of a deflocculating agent used in the initial state of its production. The V.M. of our product is less than 1% and usually is close to 0.

Our novel form of attapulgite bears no resemblance to its attapulgite precursor. Attapulgite in its raw, hydrous state is crystalline and produces a characteristic X-ray diffraction pattern. The product of our invention is substantially anhydrous, by way of contrast with the hydrated attapulgite, and it is distinctly amorphous, as determined by X-ray diffraction procedure.

While both attapulgite crystals and our calcined particles may be described as being elongated, these particles differ considerably from each other in the order of magnitude of dimensions of particles. Our magnesium aluminosilicate particles for the most part are about 2 to about 4 microns wide, more usually 2 to 3 microns wide, with a length within the range of about 5 to about 50 microns, and more usually within the range of 10 to 20 microns. In contrast, electron micrographs show that attapulgite crystals attain a maximum length of only 4 to 5 microns and a thickness of a mere 50 to 100 A.

Thus, our product consists of particles which although apparently noncrystalline nevertheless have a definite geometrical form, whereas raw clay (or extruded raw clay) milled to the same particle size, and calcined under identical conditions, will appear under an optical microscope as shapeless, granular masses. These facts indicate that individual elongated particles in our product have been derived from a large number of attapulgite crystals, with the latter aligned in a relationship very different from the random brush heap arrangement of crystals in raw clay, extruded raw clay, or in simple clay slips which have been dried. This novel orientation of colloidal attapulgite needles acquired by drying the quiescent, chemically deflocculated attapulgite dispersion is apparently set or preserved during the calcination of the dried product which takes place at a temperature at which the attapulgite crystal structure is destroyed and incipient sintering occurs.

In addition to the differences brought out above, there exist other and significant differences between our magnesium aluminosilicate product and known forms of attapulgite clay. One of the most apparent differences is that the bulk density of our material is appreciably lower than known forms of the parent attapulgite clay. For example, the bulk density of raw mildly dried clay is about 25 to 35 lbs./cu. ft. Activation increases the density to 30 lbs./cu. ft. or more. Our material, although it has undergone a severe calcination which would be expected to increase its bulk density considerably over that of raw clay, has a bulk density of only 12 to 20 lbs./cu. ft., and usually about 14 to 18 lbs./cu. ft. All bulk density values reported herein refer to tamped bulk density values obtained by the settling method described in U.S. 2,477,386 to William S. W. McCarter.

Further, the surface area of our material is from 1 to 25 square meters per gram, which is significantly lower than the surface area of raw attapulgite clay or activated attapulgite clay, both of which have surface areas in the neighborhood of 200 square meters per gram. Surface areas reported herein refer to so-called "B.E.T." values determined after drying a sample at 350° F. by a nitrogen adsorption method described by S. Brunauer, P. H. Emmett, and E. Teller in their article entitled "Adsorption of Gases in Multi-molecular Layers," on page 309 of Journal of American Chemical Society, vol. 60, February 1938, using the molecular size data of H. K. Livingston presented in his article entitled "Cross-sectional Areas of Molecules Adsorbed on Solid Surfaces," on page 569, Journal of the American Chemical Society, vol. 66, April 1944.

The magnesium aluminosilicate products of our invention are equal to or superior to various commercial diatomaceous silica filter aids in their clarity-flow relationship in the filtration of sugar solutions. As in the case of diatomaceous filter aids, the relatively high flow rate products of our invention generally yield a lower clarity filtrate than those products of our invention which have lower flow rates. Hence, a compromise must be made between flow rate and clarity in selecting the specific processing steps, particularly the calcination step, which determine these variables. In addition to acceptable flow rate and clarity, the products of the present invention form filter cakes which are as firm and adhesive as cakes formed by diatomaceous silica products.

It is believed that the unique shape of our novel fiber-like particles accounts for the effectiveness of our material as a filter aid and that such particles function in a manner similar to diatoms in building a rigid porous filter cake during clarification. This belief is corroborated by the results of numerous studies of the filtration properties of many types of clays (e.g., swelling bentonite, nonswelling bentonite, kaolin, attapulgite) processed by "dry" procedure and by the "wet" process of our invention. Only the novel predominately fiberlike form of attapulgite produced by the process of the present invention exhibited filtration properties comparable with those of diatomaceous earth filter aids in the filtration of sugar solutions.

More specifically, the clay we use in our process is attapulgite clay in its natural hydrous form. The clay may be raw clay for reasons of economy although clay which has been refined to eliminate coarse lumps, iron, quartz or other impurities may be employed. The clay may be dried somewhat prior to use in our process. As is known to those familiar with clay minerals, drying of our clay to a V.M. less than about 18% impairs or eliminates the colloidal properties of the clay—i.e., the ability of the clay to be dispersed in water into its ultimate colloidally dimensioned particles. Therefore, the starting clay, if dried, must be one which has never been dried to a V.M. below about the 18% level. In some instances, it may be advantageous to use raw clay which is mixed with water to an extrudable consistency, e.g., a mixture having a V.M. of about 50% to 60%, extruded into pellets or the like and then mildly dried.

The clay is crushed, as to minus 4 mesh, and is slipped with water containing a deflocculating agent in a vessel provided with means for agitating the slip. The deflocculating agent may be added to an undispersed clay slip or the undispersed clay slip may be added to a solution of deflocculating agent. It is essential to agitate the clay in the water to effect the required dispersion. Any high speed agitator will suffice. Typically, the clay solids content of the deflocculated slip is from about 14% to about 18% of the weight of the slip, calculated on a volatile free clay basis. Slips as dilute as 10% volatile free clay solids may be used although the necessity for drying the larger quantity of water in subsequent processing will adversely affect the economy of such operation. We may use slips as concentrated as about 25% or somewhat more (based on the volatile free clay weight), although the ultimate product generally will not possess the same degree of clarification efficiency as will a product prepared utilizing a less concentrated slip unless special reagents, e.g., NaOH, are used to enhance the clay dispersion at this high clay solids level. This may be explained by the importance of dispersing the attapulgite aggregates substantially completely into its ultimate colloidally dimensioned particles. Obviously, the use of insufficient water in the slipping step will favor the presence of undispersed clay particles. It will be noted that the quantity of water used in slipping our clay is substantially greater than the amount of water employed in the well-known prior art practice of extruding our clay with a plasticizing quantity of water to improve its adsorptive properties or to enhance its gel-forming properties. It will be shown in the examples that follow that the extrusion of a mixture of our clay with water is an unsatisfactory substitute in our process for the step of forming a deflocculated clay slip.

As mentioned, a deflocculating agent, such as, for example, sodium silicate or tetrasodium pyrophosphate, must be employed to defflocculate the colloidal attapulgite particles which possess interparticle attraction in the absence of the deflocculating agent. The deflocculating agent neutralizes or eliminates the interparticle attraction with a degree of efficiency which depends on the concentration and capacity of the deflocculating agent. The action of the deflocculator on the clay-water slip is manifested by a marked thinning of the slip when the deflocculating agent is incorporated therein. In the absence of deflocculating agent, our clay dispersions would be thickened systems, gel-like in character. The deflocculating agent is used in an amount typically within the range of about 1.0% to about 5.0%, based on volatile free weight of the clay. Particularly good results have been obtained using tetrasodium pyrophosphate in amounts of about 2.4%, based on the volatile free weight of the clay. In general, it may be said that the optimum quantity of deflocculating agent is that which results in an aqueous slip of minimum viscosity. The clay content of the slip will also influence the optimum quantity of deflocculator. Other materials used by the clay industry as deflocculating agents may also be used in case simple experimentation indicates that sufficiently fluid slips of the desired solids level can be produced with these agents. As examples of such deflocculating agents may be cited disodium dihydrogen pyrophosphate, sodium tripolyphosphate, sodium lignosulfonate, sodium salts of condensed naphthalene sulfonic acids and corresponding potassium and lithium compounds when they are sufficiently soluble.

In some instances, the incorporation of a small amount of an inorganic surface active agent in the slip will improve the dispersion of the clay. When used, the surface active agent is preferably added to a previously deflocculated slip of clay, preferably with agitation which does not effect substantial aeration. The function of the agitation is to thoroughly disseminate the surface active agent in the slip without any aeration requirement since we have found that foaming the slip produces no observable benefit in terms of the quality and nature of the ultimate product. The surface active agents must be soluble or dispersible in the slip and must not coagulate the clay dispersion. The optional organic surface active agent is not a satisfactory substitute for our essential deflocculating agent and it merely supplements the action of the deflocculating agent.

The presence of materials which will flocculate or coagulate the deflocculated clay dispersion is to be avoided.

The aqueous clay slip, in the form of a dispersion of fluid consistency, is then dried to a grindable consistency by evaporation of water from the slip. As mentioned, the fluid clay dispersion is maintained quiescent or immobile during drying which may be carried out under atmospheric pressure or under vacuum. While it is being dried, the temperature of the slip is maintained below the boiling point at the pressure employed so that little or no ebullience of the slip occurs. For practical reasons, we prefer to dry our slip while it is in the form of a thin film, e.g., a layer about $\frac{1}{64}''$ to $1''$ deep. Tray driers and conventional drum driers are useful in carrying out the drying step. Experience has shown that the material is preferably dried to a V.M. not less than 5%, and usually to a V.M. within the range of 12% and 30%. Material dried to a V.M. less than about 5% produces excessive undesirable fines (e.g., particles finer than about 2 microns) during the subsequent milling step. On the other hand, material having a V.M. considerably greater than 30% may be difficult to grind to the desired degree of fineness. However, by appropriate choice of grinding equipment, drying to a V.M. higher than 30% may be satisfactory. The particle size desired in the product will determine the optimum V.M. of the dried material. Excellent filter aid products have been prepared when the slip was dried to a V.M. from 12% to 17%.

Although filtration might suggest itself as an alternative method for dewatering the slip, it has been found that the desired ultimate microscopic fibrous product will not be produced when the slip is dewatered by filtration. This observation corroborates our belief that evaporation of water from the deflocculated clay slip results in a more ordered, probably layerlike reorientation of aligned individual attapulgite particles, much like asbestos aggregates. Filtration would be expected to inhibit such an orderly reorientation as a result of compression on the particles during the dewatering of the slip.

The dried material is then ground to about 100% minus 200 mesh in any suitable mill, such as a Mikro-Pulverizer (a high speed hammer mill), ball mill, roller mill or cage mill. The degree of fine grinding will be determined by the properties desired in the filter aid product. It is known that the clarity-flow rate correlation of filter aids vary with the particle size distribution of the filter aid and this property can be controlled at this point of the process. Thus, the material may be ground somewhat coarser than 200 mesh or somewhat finer, if desired.

The ground intermediate product has many properties normally characteristic of raw attapulgite. For example, the clay is still crystalline and retains colloidal and adsorptive properties typical of raw clay. This product is transformed by calcination at a temperature sufficient to eliminate substantially completely the water of hydration and free moisture from the clay lattice but at a temperature below the fusion point of the mass. Incipient sintering appears to occur. Removal of water from the clay lattice eliminates the colloidal, gel-forming properties of the clay and destroys the clay lattice, forming an amorphous anhydrous material which cannot accurately by called attapulgite. The calcination temperature is usually between about 1300° F. and 2200° F. or somewhat higher. The calcination time is from 15 minutes to several hours, depending on the equipment and temperature, and is sufficient to reduce the product V.M. to a value less than 1%. The preferred temperature and time will depend on the furnace in which calcination is carried out and will generally vary between about 1400° F. and about 1800° F. the optimum calcination temperature will vary considerably with the intended use of the filter aid product and the clarity-filter rate relationship desired in the material. By way of illustration, it may be said that when optimum clarity is sought with some sacrifice in flow rate in the filtration of sugar or other aqueous solutions, a calcination temperature of the order of 1500° F., for example, will be employed rather than 1750° F. On the other hand, calcination at the higher temperature level may result in a product having a substantially higher filter rate for aqueous solutions although somewhat lower clarification capacity than the product calcined at the lower temperature and may be the preferred temperature when the product is intended for such use. In the filtration of organic liquids the effect of calcination temperature on filtration rate may be less pronounced than when aqueous liquids are filtered. Thus, in the filtration of organic liquids, the higher clarities obtainable with products calcined at temperatures closer to the lower end of the temperature range set forth above may make the use of such lower temperatures preferable. When organic surfactants have been used, calcination is carried out in the presence of sufficient air or in other oxidizing atmosphere to burn off any organic matter used in the preparation of the product. Calcination also incorporates the nonvolatiles of the defluocculating agent in the product and reduces the surface area of the clay, thus in effect thermally deactivating the attapulgite.

The calcined product is composed of friable masses of loosely aggregated fine particles. These masses are disaggregated by mild pulverization. Many apparatuses are suitable for the purpose, among which may be mentioned hammer mills operated with slow moving hammers and roller mills. These mills may be equipped with classifiers if strict control of product particle size is desired. Simple dry screening devices will also suffice to break up the aggregates into the individual fine filter aid particles.

If desired, materials such as calcite flour or magnesite, for example, may be incorporated with the calcined product for pH adjustment when the product is intended for use in clarifying sugar solutions.

The following examples are given for illustrative purposes only and are not to be construed as limiting our invention to the specific details set forth herein.

In the examples the flow rate testing was performed in a bomb filter test unit. The unit consisted of a vertical metal tube flanged at the bottom so that it could be bolted to a horizontal circular filter plate which supported a filter cloth and had a vertical opening through the center to permit fluid flow. A discharge valve with a threaded end was screwed to the underside of the filter plate. The filter area was 1.0 square inch. The tube assembly was enclosed in a circulating heated oil bath for temperature control. Measurements were made on the unfiltered and filtered solutions using a Klett Summerson Photoelectric Colorimeter to determine degree of clarity. A red glass filter was used.

A mixture containing 10% raw sugar and 90% refined sugar was dissolved in sufficient water to produce a 46–47° Brix solution. The filter aid was then added at a 1.33% weight dosage to the solution and the contents heated to 100° F. This slurry was then poured into the bomb filter. The bomb was capped and immediately pressurized with nitrogen to 50 p.s.i.g. before opening the flow discharge valve. The discharge valve was opened one minute after charging the solution. The filtrate volumes and corresponding time intervals were measured and recorded. The flow rate was calculated from time required for 500 cc. of solution to flow through the filter aid. Clarity and turbidity measurements were made on the 100 to 500 cc. composite filtered solution.

The absolute flow rate and clarity values were converted to index values compared with the corresponding values determined by tests made on a standard filter aid product and were determined by assigning the absolute flow rate and clarity values of the standard silica filter aid product the index values of 100 and 100, respectively. The standard filter aid was Hyflo Super-Cel, a flux-calcined diatomaceous silica product consisting predominantly of 8 to 38 micron particles.

EXAMPLE I

Experiments were performed to determine the filtration characteristics of attapulgite products "dry" processed in accordance with the prior art by drying raw clay to various volatile matter contents (hereafter set forth), grinding to minus 200 mesh, calcining at 750° F. to volatile matter contents within the range of 1% to 6% and screening the calcined product to recover a minus 200 mesh product. Runs were also made to determine whether merely calcining the dried, milled raw clay at more elevated temperatures than taught by the prior art (to eliminate substantially volatile matter) would result in a filter aid product comparable with the diatomaceous earth standard. Also studied was a commercial activated attapulgite product. The results are reported in Table I.

*Table I*

FILTRATION PROPERTIES OF ATTAPULGITE PRODUCTS—46–47° BRIX SUGAR SOLUTIONS

| | Flow rate index | Clarity index |
|---|---|---|
| Attaclay LVM,[1] Minus 200 Mesh | 4 | 124 |
| Raw Clay, Dried to 18.5% V.M., Ground to −200 Mesh, Calcined 750° F./30 Min | 5 | 124 |
| Raw Clay, Dried to 27% V.M. Ground to −200 Mesh, Calcined 750°F./30 Min | 5 | 112 |
| Raw Clay, Dried to 14.4% V.M. Ground to −200 Mesh, Calcined 750° F./30 Min | 19 | 92 |
| Raw Clay, Dried to 18.5% V.M., Ground to −200 Mesh, Calcined 1,750° F./30 min | 23 | 80 |
| Raw Clay, Dried to 27% V.M., Ground to −200 Mesh, Calcined 1,750° F./30 Min | 15 | 124 |
| Raw Clay, Dried to 14.4% V.M., Ground to −200 Mesh, Calcined 1,750° F./30 Min | 13 | 120 |

[1] A commercial activated attapulgite clay product; V.M. (as produced) 6–8%, F.M. (as produced) 0.2%.

The results reported in Table I show that all of the "dry processed" attapulgite clays, i.e., the commercial product and those prepared in accordance with prior art procedure or modification thereof, had extremely low flow rate indexes as compared with the silica standard.

EXAMPLE II

This example illustrates the production, by the method of the present invention, of a filter aid product having a flow rate and clarification capacity substantially the same as the flux-calcined diatomaceous silica standard.

A sample of Georgia-Florida fuller's earth from a mine near Attapulgus, Georgia, was slipped at room temperature in a tetrasodium pyrophosphate solution to 18.8% solids in a Denver Conditioner (a paddle-agitated vessel used in the conditioning of ores for flotation). The tetrasodium pyrophosphate content of the slip was 2.4%, based on the volatile free weight of the clay. The resultant fluid slip was placed in trays in a layer 1" deep and the trays were placed in an oven maintained at 300° F. until the V.M. of the slip was 14.6%. The drying conditions were such that the slip was quiescent and no boiling occurred. The dried material was crushed in a roller mill and ground in a high speed hammer mill using a 0.020" screen. The minus 200 mesh material was calcined at 1750° F. for 30 minutes and the calcined material was screened through a 200 mesh screen using a RoTap classifier.

The flow rate index of the minus 200 mesh product was 106 and the clarity index was 98. The flow rate index of the product was substantially higher than that of any of the attapulgite clay products of Example I.

The results, compared with those of the previous example, show the superiority of a filter aid product of this invention over attapulgite products which have been similarly sized and calcined at various temperatures without the preliminary formation of a thin, fluid deflocculated aqueous dispersion of the clay.

EXAMPLE III

This example illustrates the generally inverse clarification-flow rate relationship of the products of our invention and shows that various attapulgite products may be produced with filtration properties comparable with or superior to those of various commercial grades of diatomaceous silica filter aids.

In the preparation of filter aid products of our invention, raw Georgia-Florida fuller's earth from a deposit near Attapulgus, Georgia, was used. The clay was slipped at room temperature for about 5 minutes in a large Waring Blendor at an 18% by weight clay solids level (based on the volatile free weight of the clay) in a dilute aqueous solution of tetrasodium pyrophosphate. The tetrasodium pyrophosphate was used in the amount of 2.4%, based on the volatile free weight of the clay in the slip. The resultant fluid slip was then conditioned at room temperature for 5 minutes in the Waring Blendor with the sodium soap of tall oil fatty acids, in the amount of 1.5% of the volatile free weight of the clay. The conditioned slip had a thin creamlike consistency with only a small amount of foam on the surface. Portions of the slip were placed in trays in a layer 1" deep. The slips were tray dried in an oven held at less than 250° F. to a volatile matter content of 15% to 17%. Drying conditions were such that the slip was quiescent and no boiling occurred. The dried material was crushed in a roller mill and ground in a high speed hammer mill using a 0.027" screen. The pulverized intermediate product was calcined (at temperatures and for times reported below) in a static bed muffle furnace. The calcined products consisted of friable lumps which were pulversized by screening through a 200 mesh screen (using a RoTap screener).

The filtration properties of filter aid products prepared as described above were compared with those of the following commercial diatomaceous silica filter aids, which are listed in order of decreasing clarity index (and increasing flow rate index): Celite 505, a high clarity-low flow rate product; Hyflo Super-Cell; Celite 502, believed to be a flux-calcined diatomaceous silica product; and Dicalite Speed Flow.

The processing variables and filtration characteristics of the attapulgite-based filter aids and commercial diatomaceous silica filter aids on sugar solutions (as determined by the test procedures described above) are reported in Table II.

Table II

| Attapulgite products | Calcination temp./time | Flow rate index | Clarity index | Cake thickness, inches |
| --- | --- | --- | --- | --- |
| Sample No. 1 | 1,750° F./30 Min | 169 | 93 | 1 1/16 |
| Sample No. 2 | 1,650° F./30 Min | 88 | 104 | 1 3/16 |
| Sample No. 3 | 1,550° F./30 Min | 37 | 117 | 1 2/16 |
| Celite 505 | | 10 | 130 | |
| Dicalite Speed Flo | | 38 | 108 | 1 2/16 |
| Hyflo Super-Cel [1] | | 100 | 100 | 1 4/16 |
| Celite 503 | | 145 | 91 | |

[1] Standard.

The results show that the flow rate-clarity relationship of filter aid products made from attapulgite by the process of the present invention may be controlled by calcination temperature. The results also show that grades of attapulgite-derived products can be produced with filtration properties comparable and in many instances superior to those of commercial diatomaceous silica products, even the high flow rate grades of diatomaceous silica. All other influencing variables being kept constant, calcination at 1550° F. (sample No. 3) produced a high clarity-relatively low flow rate product. Calcination at 1750° F. resulted in a product (sample No. 1) which had a substantially higher flow rate although somewhat lower clarity index than sample No. 3 and which had a higher flow rate index at substantially the same clarity index as the standard (Hyflo Super-Cel).

EXAMPLE IV

This example illustrates the preparation, in accordance with this invention, of a filter aid from attapulgite clay using a sodium silicate as the deflocculating agent.

Raw Georgia-Florida fuller's earth from a deposit near Attapulgus, Georgia, was slipped for about 5 minutes in a large Waring Blendor at a 15% solids level in an aqueous solution of sodium silicate, using 8% sodium silicate solution, based on the volatile free weight of the clay. The sodium silicate was a 42.6° Bé. solution analyzing 9.10% $Na_2O$ and 29.6% $SiO_2$. The slip was conditioned for 5 minutes in the Waring Blendor with 1.5%, based on the volatile free weight of the clay, of sodium soap of tall oil fatty acids. The slip was dried in trays (without agitation or boiling) in an oven held at less than 250° F. to a volatile matter content of about 16%. The dried material was crushed in a roller mill and ground in a Mikro-Pulverizer using a 0.027" screen, calcined in air at 1750° F. for 30 minutes in a muffle furnace and screened through a 200 mesh screen. The product was found to have a filter rate index and clarity index of 120 and 103, respectively. The product was thus superior to the standard, particularly in its filter rate.

EXAMPLE V

Various surface active agents including materials of anionic, nonionic and cationic character, were employed in the preparation of filter aid products from attapulgite clay in accordance with our process and the filtration properties of these products were determined. The following surface active agents were employed: Monamid 15-70W and Monamid 150-ADD, which are nonionic fatty acid alkanolamides and are produced, respectively, by reaction of mixed unsaturated fatty acids with diethanolamine and refined coconut oil fatty acid with diethanolamine; red oil, which is an anionic material; Kessco X-168, a cationic substituted imidazoline produced from oleic acid and aminoethylethanolamine; Nalcamine G-39M, a cationic material which is 1(2-aminoethyl)-2-(mixed heptadecenyl and heptadecadienyl)-2-imidazoline; Arquad 16, which is cationic and consists mainly of trimethyl-n-hexadecylammonium chloride.

In the preparation of the filter aid products, raw clay was pugged with water to a V.M. of 65%. The clay was from the same deposit as the clay used in the previous examples. The pugged material was slipped for an hour in a paddle agitated vessel to 18.1% solids (based on the volatile free clay weight) in water in which was dissolved 2.4% tetrasodium pyrophosphate (based on the volatile free weight of the clay). The slip was conditioned in a Fagergren agitator (air off) for 5 minutes with 1.5% of surface active agent (based on the volatile free weight of the clay). Each conditioned slip was placed in a 1" layer in trays which were placed in an oven held at less than 250° F. Each slip was dried without agitation to a V.M. of 16% to 17%. The dried materials were crushed in a roll crusher, ground in a high speed hammer mill to minus 200 mesh and calcined at 1750° F. for 30 minutes. The calcined products were screened through a 200 mesh screen on a RoTap machine and the minus 200 mesh material inspected in a microscope at (810×) and also evaluated for clarification index and flow rate index.

All of the products appeared in the microscope as being composed of a predominant amount of discrete elongated irregular fibers (or branched arrangement of such particles).

The filtration properties of the various products are tabulated in Table III.

Table III

| Surface active agent | Flow rate index | Clarification index |
| --- | --- | --- |
| Monamid 15-70W (N) | 123 | 100 |
| Monamid 150 DR (N) | 112 | 96 |
| Red Oil (A) | 123 | 92 |
| Kessco X-168 (C) | 146 | 100 |
| Nalcamine G-39M (C) | 121 | 92 |
| Arquad 16 (C) | 126 | 86 |

C—cationic. A—anionic. N—nonionic.

The results reported in Table III show that products of this invention had a clarification index comparable with that of the commercial diatomaceous silica filter aid standard at a correspondingly high flow rate value.

EXAMPLE VI

This example illustrates the necessity of obtaining a good dispersion of the clay in the slipping step in order to obtain a product which has flow rate and clarification properties comparable with commercial diatomaceous filter aids.

In the investigation 18% solids slips of attapulgite clay were made up in a Waring Blendor using 1.5% and 2.4% tetrasodium pyrophosphate (based on the volatile free weight of the clay). Slipping time was 5 minutes. Each slip was conditioned for 5 minutes in the Waring Blendor with 1.5% (based on the volatile free weight of the clay) of tall oil soap. The slips were dried at 100° F. to 16% V.M., crushed, ground to minus 200 mesh in a high speed hammer mill, calcined at 1750° F. for 30 minutes and pulverized by screening through a minus 200 mesh screen. The properties of the minus 200 mesh product are reported in Table IV.

Table IV

| Percent tetrasodium pyrophosphate | Flowrate index | Clarification index |
| --- | --- | --- |
| 2.4 | 137 | 88 |
| 1.5 | 234 | 37 |

The results show that the poorly dispersed slip, the one prepared with only 1.5% tetrasodium pyrophosphate, resulted in a product having filtration properties inferior to that obtained using 2.4% of this deflocculating agent. Although the flow rate of the product was exceptionally high, its clarification index was substantially below that of any of the commercial diatomaceous earth products. When viewed under a microscope at 810×, elongated particles were observed only in the product obtained with 2.4% of deflocculating agent. Although 1.5% deflocculator appeared to be insufficient to disperse the clay with the equipment, procedure and particular sample of clay involved, this level of deflocculator may produce very satisfactory dispersions when using less concentrated clay slips or by employing attapulgite clay from other deposits or by putting more work into the slip.

EXAMPLE VII

This example illustrates that extrusion of water-plasticized raw attapulgite clay, as taught in the prior art, in conjunction with sizing and calcining, is not a satisfactory substitute for the step of producing a deflocculated aqueous dispersion of attapulgite clay in the production of a filter aid.

A sample of raw Georgia-Florida fuller's earth (V.M. 50%) from a mine near Attapulgus, Georgia, was crushed to minus 4 mesh and mixed in a pug mill with an equal weight proportion of water. The mixture was pugged for about 10 minutes and the pugged mixture was extruded in an auger extruder through a die having a ¼-inch land. The extrudate was dried in an oven at about 300° F. to a V.M. of 21% and the dried extrudate was pulverized by a single pass through a Mikro-Pulverizer (6 hammers) using a 0.020-inch screen. The pulverized material was calcined in a muffle furnace at a chamber temperature of 1750° F. for 30 minutes. The calcined agglomerated material was placed on a RoTap shaker and screened through a 200 mesh screen. The average particle size of the product was 19 microns.

The flow rate index and clarification index of this product were 44 and 68, respectively. These values, as compared with the results of Example II, indicate that merely mixing the raw clay with water and extruding the wet mixture is not the equivalent of producing a deflocculated clay dispersion in the production of a filter aid from attapulgite clay.

EXAMPLE VIII

This example illustrates that attapulgite is unique among colloidal clay minerals in that when it is processed in accordance with an example of the "wet" method of our invention, it produces a product containing a predominating amount of unique microscopic irregular elongated particles, whereas other clays do not. This example illustrates further the superiority of our "wet" processed attapulgite clay as a filter aid over other clays, "dry" or "wet" processed.

The clays investigated were attapulgite clay; Wyoming bentonite (a sodium montmorillonite clay frequently referred to as "swelling" bentonite); and southern bentonite or "sub-bentonite" as it is sometimes called, which is a calcium montmorillonite and, unlike sodium montmorillonite, is a nonswelling clay. Also investigated was a Georgia kaolin clay.

The general procedure followed in "wet processing" the various clays involved forming an 18% solids clay slip in water in which was dissolved 2.4% tetrasodium pyrophosphate (based on the volatile free weight of the clay). A Waring Blendor was employed and slipping time was 5 minutes. In the case of Wyoming bentonite this step had to be modified to form a 10% solids slip since this clay could not be dispersed at the 18% solids level. 1.5% sodium soap of tall oil fatty acid (based on the volatile free weight of the clay) was added to each slip and uniformly mixed therein by agitating the soap-conditioned slip for 5 minutes in the Waring Blendor. The slip was then dried without agitation (in a 1" deep layer) in a tray held in an oven maintained at less than 250° F. to a V.M. of 15% to 20%. The dried slip was crushed in a roll crusher and ground to minus 200 mesh in a high speed hammer mill, calcined for ½ hour at 1750° F., and the calcined product screened through a 200 mesh screen.

(a) The minus 200 mesh product produced by "wet" processing each of the above-mentioned processed clays was observed under an optical microscope (810×). Only those products which were prepared from attapulgite contained a predominating amount of elongated particles. The other clays resulted in products which appeared as shapeless granular masses with no evidence of elongation of particles.

(b) Samples of some of the aforementioned clays were "dry processed" by calcining the raw clay at 1750° F. for 30 minutes (without previous slipping) and grinding the calcined material to minus 200 mesh. The products were studied under an optical microscope (810×) and none was found to show any evidence of elongated particles.

(c) The filtration characteristics of each of the "wet" and "dry" processed clays of Example VIII (a) and (b) were measured. Only the "wet" processed attapulgite which appeared fibrous under the microscope was found to have clarity-flow rate index comparable with commercial grades of diatomaceous earth filter aids. The clarity-flow rate index relationships of the various products are reported in Table V.

Table V

FILTRATION PROPERTIES OF PROCESSED CLAYS

| | "Dry" Processed Clays | | |
| --- | --- | --- | --- |
| | Flow rate index | Clarification index | Cake thickness, inches |
| Southern Bentonite | 292 | 84 | 5/16 |
| Wyoming Bentonite | 200 | 68 | 5/16 |
| Attapulgite Clay | 44 | 68 | 7/16 |
| | "Wet" Processed Clays | | |
| Southern Bentonite | 150 | 78 | 5/16 |
| Wyoming Bentonite | 237 | 56 | 9/16 |
| Kaolin Clay | 16 | | |
| Attapulgite Clay | 135 | 100 | 13/16 |

The results show that of the processed clays only the "wet" processed attapulgite provided a thick filter cake and had both high clarity index and high flow rate index. Wet processing produced no observable benefit in the case of the bentonites. Kaolin was completely unacceptable as a filter aid.

It will be understood that the foregoing detailed examples are illustrative only, for variations and changes may be made in the conditions of the process without departing from the substance of the invention as herein disclosed and defined in the appended claims.

We claim:

1. A method of treating attapulgite clay to render it useful as a filter aid which comprises providing a thin aqueous dispersion of colloidal attapulgite clay utilizing a deflocculating agent for said clay, drying said dispersion by evaporating water therefrom so as to form a material of grindable consistency while maintaining said dispersion quiescent, grinding the dried material and calcining the ground material at a temperature and for a time sufficient to substantially eliminate volatile matter therefrom without fusing the material.

2. A method of treating attapulgite clay to render it useful as a filter aid which comprises agitating a small amount of attapulgite clay which has never been dried to a V.M. less than about 18% in water containing a deflocculating agent for said clay so as to form a deflocculated aqueous dispersion of said clay, drying said dispersion by evaporating water therefrom so as to form a material of grindable consistency while maintaining said dispersion quiescent, grinding the dried material and calcining the ground material at a temperature and for a time sufficient to eliminate substantially volatile matter therefrom without fusing the material.

3. A method of treating attapulgite clay to render it useful as a filter aid which comprises agitating a small amount of colloidal attapulgite clay in a dilute aqueous solution of tetrasodium pyrophosphate so as to form a thin deflocculated aqueous dispersion of said clay, drying said dispersion by evaporating water therefrom to form a material of grindable consistency while controlling the temperature and restricting agitation so as to maintain said dispersion quiescent during drying, grinding the dried material, calcining the ground material at a temperature within the range of from about 1500° F. to about 2200° F. for a time sufficient to eliminate substantially volatile matter and pulverizing the calcined material.

4. A method of treating attapulgite clay to render it useful as a filter aid which comprises providing an aqueous slip of colloidal attapulgite clay utilizing tetrasodium pyrophosphate as a defiocculant for said clay, drying said slip by evaporating water therefrom at a temperature below which said slip is ebullient and without agitating said slip to form a material of grindable consistency, grinding the dried material, calcining the ground material at a temperature within the range of from about 1400° F. to about 1800° F. for a time sufficient to substantially eliminate volatile matter therefrom and pulverizing the calcined material.

5. A method of treating attapulgite clay to render it useful as a filter aid which comprises providing an aqueous slip of colloidal attapulgite clay utilizing sodium silicate as a defiocculant for said clay, drying said slip by evaporating water therefrom at a temperature below which said slip is ebullient and without agitating said slip to form a material of grindable consistency, grinding the dried material, calcining the ground material at a temperature within the range of from about 1400° F. to about 1800° F. for a time sufficient to substantially eliminate volatile matter therefrom and pulverizing the calcined material.

6. A method of treating attapulgite clay to render it useful as a filter aid which comprises agitating a small quantity of colloidal attapulgite clay in an aqueous solution of a deflocculating agent for said clay so as to form a thin deflocculated clay dispersion, drying said dispersion in the form of a film about 1/64" to 1" thick by evaporaing water therefrom while maintaing said film quiescent to form a material of grindable consistency, grinding the dried material, calcining the ground material at a temperature within the range of from about 1400° F. to about 1800° F. for a time sufficient to substantially eliminate completely volatile matter therefrom and pulverizing the calcined material.

7. A method of treating attapulgite clay to render it useful as a filter aid which comprises dispersing a small amount of colloidal attapulgite clay in water having dissolved therein a deflocculating agent for said clay to form a thin fluid deflocculated aqueous dispersion of said clay, drying said dispersion to a V.M. of about 12% to 30% in the form of a thin layer thereof by evaporating water therefrom while maintaining said dispersion quiescent, grinding the dried material, calcining the ground material at a temperature and for a time sufficient to reduce the volatile matter content thereof below 1% without fusing the material, and pulverizing the calcined material.

8. A filter aid comprising essentially an anhydrous magnesium aluminosilicate in the form of amorphous elongated particles of miscroscopic dimensions and having a surface area of about 1 to 25 square meters per gram, a tamped bulk density of 12 to 20 lbs./cu. ft. and essentially the same chemical analysis as volatile-free attapulgite clay.

9. Thermally treated attapulgite clay, useful as a filter aid, characterized by having a surface area of about 1 to 25 square meters per gram, a tamped bulk density of 12 to 20 lbs./cu. ft. and essentially the same chemical analysis as volatile-free attapulgite clay, the majority of the particles of said thermally treated attapulgite clay being in the form of elongated particles of microscopic dimensions.

10. Thermally treated attapulgite clay, useful as a filter aid, characterized by having a surface area of from 1 to 25 square meters per gram, a tamped bulk density of 12 to 20 pounds per cubic foot, a V.M. less than 1% and essentially the same chemical analysis as volatile-free attapulgite clay, the majority of the particles of said thermally treated attapulgite clay being in the form of elongated particles having a width within the range of 2 to 5 microns and a length within the range of 5 to 50 microns.

11. The product of claim 10 in which the majority of the particles are within the range of 2 to 3 microns wide and within the range of 10 to 20 microns long.

References Cited in the file of this patent
UNITED STATES PATENTS 617,079    Catlett _____ Jan. 3, 1899
1,756,906    Miketta _____ Apr. 29, 1930

OTHER REFERENCES

McCarter: "Ind. and Eng. Chem." 42, 529–533 (1950).